United States Patent
Chen

(10) Patent No.: US 9,207,685 B2
(45) Date of Patent: Dec. 8, 2015

(54) ELECTRICAL OUTLET WITH DRAINING MECHANISM

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Zhou Chen, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 233 days.

(21) Appl. No.: 14/054,800

(22) Filed: Oct. 15, 2013

(65) Prior Publication Data

US 2014/0320054 A1 Oct. 30, 2014

(30) Foreign Application Priority Data

Apr. 26, 2013 (CN) .......................... 2013 1 1478444

(51) Int. Cl.
| | | |
|---|---|---|
| *H01R 25/00* | (2006.01) | |
| *G05D 9/12* | (2006.01) | |
| *H01R 13/52* | (2006.01) | |
| *H01R 13/66* | (2006.01) | |

(52) U.S. Cl.
CPC .............. *G05D 9/12* (2013.01); *H01R 13/5227* (2013.01); *H01R 25/003* (2013.01); *H01R 13/6683* (2013.01)

(58) Field of Classification Search
CPC ..... H01R 25/00; H01R 25/003; H01R 25/006
USPC ........ 318/558; 174/50, 50.52, 53, 480; 439/1, 439/296, 300, 577, 638, 894
See application file for complete search history.

(56) References Cited

U.S. PATENT DOCUMENTS

| | | | | |
|---|---|---|---|---|
| 2,532,219 | A  * | 11/1950 | Bierce ............................. | 439/139 |
| 2010/0000757 | A1* | 1/2010 | Husain et al. .................... | 174/58 |
| 2010/0139942 | A1* | 6/2010 | Elwood ......................... | 174/68.3 |

* cited by examiner

*Primary Examiner* — Bentsu Ro
(74) *Attorney, Agent, or Firm* — Novak Druce Connolly Bove + Quigg LLP

(57) ABSTRACT

An electrical outlet for receiving an electrical plug is illustrated. The electrical outlet includes a housing defining a recess for receiving the electrical plug and a closed groove in a bottom of the recess, and a draining mechanism accommodated in the housing. The draining mechanism includes a barrel, a first sliding member, and a first driver. The barrel defines a first sliding groove and a slot communicating with both the first sliding groove and the closed groove. The first sliding groove includes a first, external open end and an opposite second open end. The first sliding member includes a first rod slidably retained in the first sliding groove through the second open end. The first driver is configured to drive the first sliding member to slide along the first sliding groove for pushing liquid out of the first sliding groove through the first open end.

8 Claims, 7 Drawing Sheets

ELECTRICAL OUTLET WITH DRAINING MECHANISM

BACKGROUND

1. Technical Field

The present disclosure relates to electrical outlets, and more particularly to an electrical outlet with a draining mechanism.

2. Description of Related Art

Many electrical outlets for outdoor use include a receptacle housed in a weatherproof outlet box which is closed by a weatherproof cover plate. The outlet box defines an opening. The cover plate is hinge mounted for opening and closing, and is spring biased towards its closed positions. The openings in the cover plate permit access to the contacts in the receptacle, while the cover plate individually controls that access. However, liquid may enter the electrical outlets when an electrical plug is inserted in the electrical outlets. Thus, a new type of electrical outlet to overcome mentioned problems is still needed.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are now described in detail, with reference to the accompanying drawings.

Figure 1:
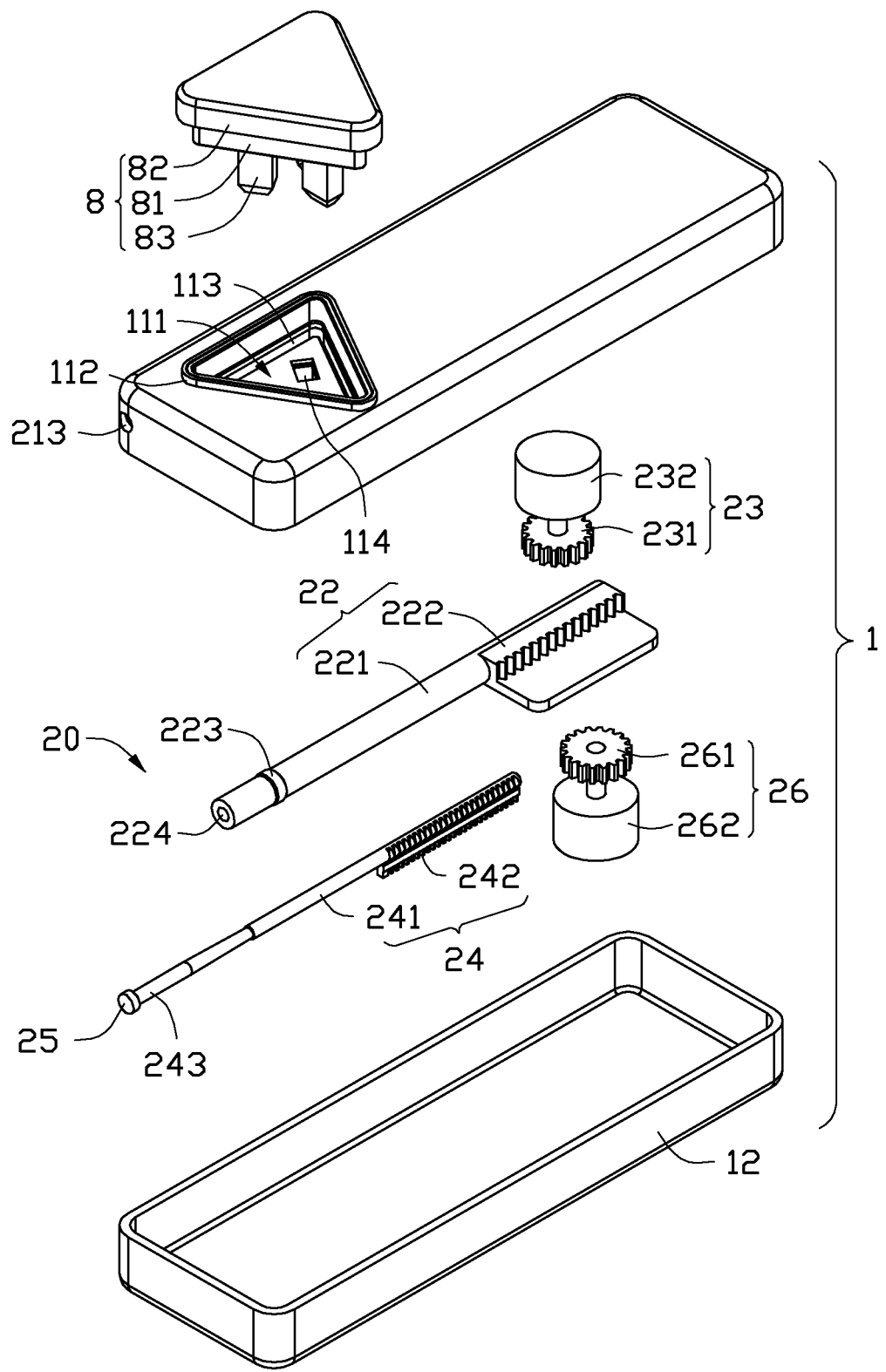
FIG. 1 is an exploded, isometric view of an electrical outlet according to an exemplary embodiment.
Figure 2:
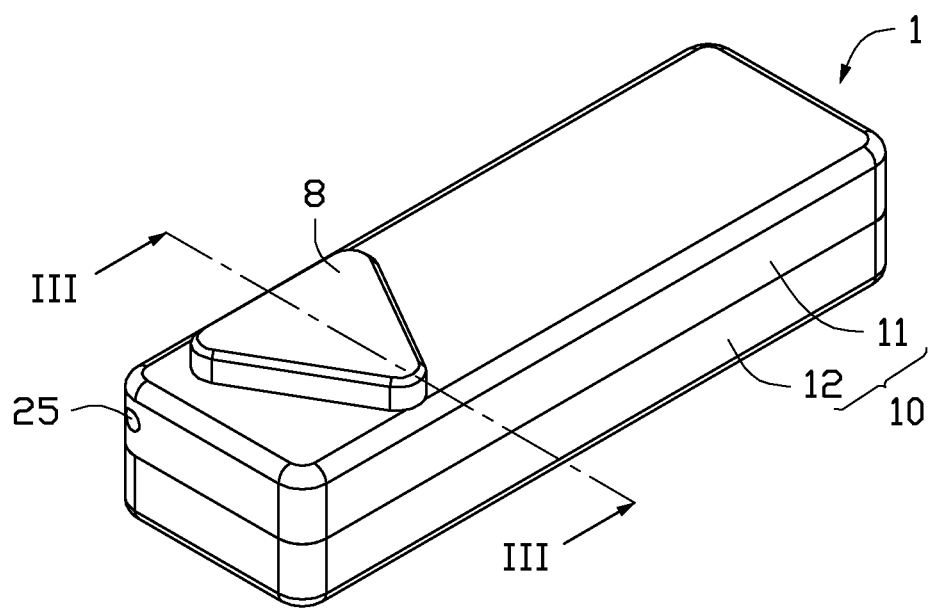
FIG. 2 is an assembled, isometric view of the electrical outlet of FIG. 1.

FIGS. 1-2 show isometric views of an electrical outlet 1 according to an exemplary embodiment. The electrical outlet 1 includes a housing 10 and a draining mechanism 20 retained within the housing 10. An electrical plug 8 includes a first block 81, a second block 82 connected to one side of the first block 81, and a number of prongs 83 protruding from an opposite side of the first block 81. The second block 82 defines a positioning groove 84 (see FIG. 3) surrounding the first block 81. The electrical outlet 1 may include electrical components (not shown), such as a circuit board, and an extension cord, plug for being electrically connected to an external power source.

Figure 3:
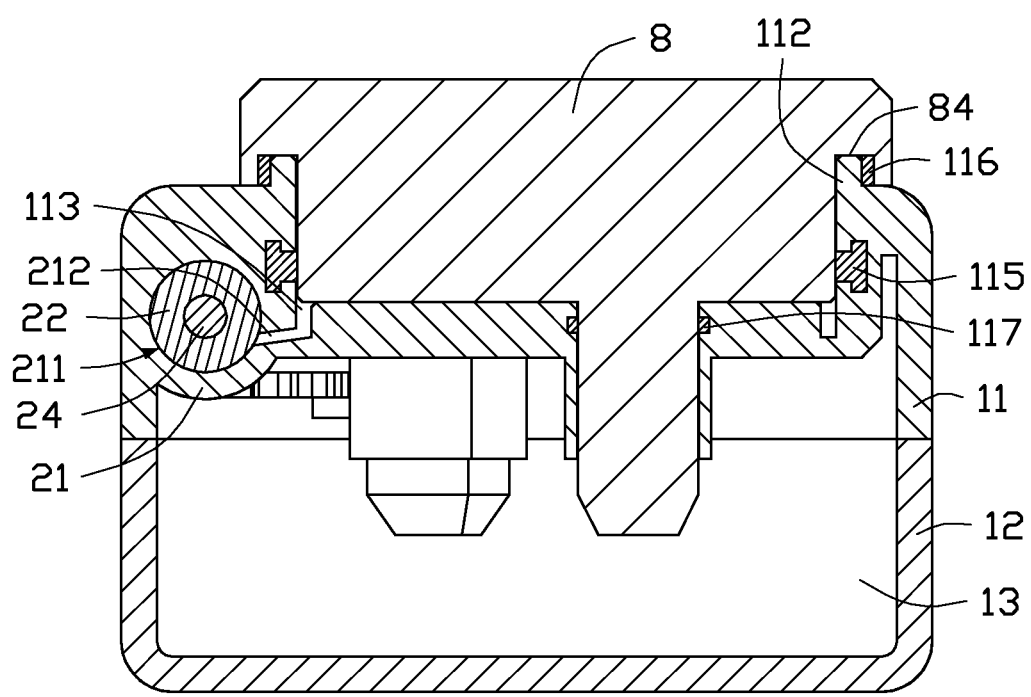
FIG. 3 is a cross-sectional view of the electrical outlet, taken along line III-III of FIG. 2.

FIG. 3 shows a cross-sectional view of the electrical outlet 1 of FIG. 2. The housing 10 includes an upper housing 11 and a lower housing 12 coupled to each other, which cooperatively define a receiving space 13 therebetween. The upper housing 11 defines a recess 111 for receiving the first block 81 of the electrical plug 8, a closed groove 113, and a number of sockets 114 in a bottom of the recess 111. In the embodiment, the closed groove 113 extends along the side surface of the recess 111. Thus, liquid that enters the recess 111 through a gap between the first block 81 and the recess 81 flows down along the side surface into the circular closed groove 113. The prongs 83 of the electrical plug 8 can be inserted into the sockets 114. The upper housing 11 includes a projection 112 surrounding the recess 111. When the electrical plug 8 is adapted, the projection 112 is retained in the positioning groove 84 of the electrical plug 8.

In the embodiment, the upper housing 11 further includes a first sealing ring 116 tightly around the projection 112. When the electrical plug 8 is adapted to the upper housing 11, the first sealing ring 116 is in tight contact with an inner surface of the positioning groove 84, thereby preventing liquid from entering the electrical outlet 1 through a gap between the upper housing 11 and the electrical plug 8.

The draining mechanism 20 includes a barrel 21, a first sliding member 22, a first driver 23, a second sliding member 24, a stopper 25, and a second driver 26.

Figure 4:
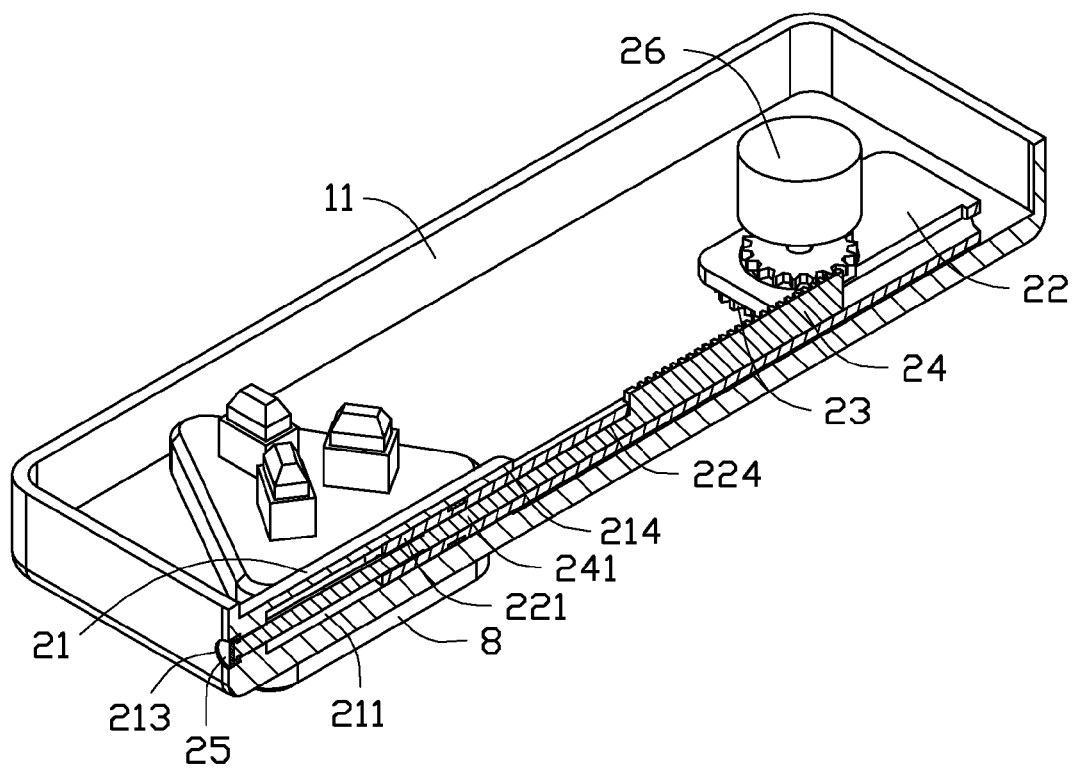
FIGS. 4-6 are schematic views showing a working process of the electrical outlet of FIG. 1.

FIG. 4 shows that the barrel 21 is formed on an internal sidewall of the upper housing 11 and defines a first sliding groove 211, and a slot 212 in a lateral surface of the first sliding groove 211. The barrel 21 has an external first open end 213, and an opposite second open end 214. The slot 212 communicates with both the first sliding groove 211 and the closed groove 113 of the upper housing 11.

The first sliding member 22 is elongated shaped and includes a first rod 221, a first rack 222 connected to one end of the first rod 221, and a second sealing ring 223 extending around the first rod 221. The first rod 221 extends through the second open end 214 of the barrel 21 and is thus slidable in the first sliding groove 211. The first rod 221 defines a longitudinal second sliding groove 224.

The first driver 23 is used to drive the first sliding member 22 to slide back and forth in the first sliding groove 211 for pushing liquid out of the first sliding groove 211 through the first open end 213. In the embodiment, the first driver 23 includes a first gear 231 and a first motor 232 with an output shaft (not labeled), to which the first gear 231 is fixed. The first gear 231 engages with the first rack 222 of the first sliding member 22, thereby converting the rotation of the first gear 231 into the sliding movement of the first sliding member 22.

The second sliding member 24 includes a second rod 241 and a second rack 242 connected to one end of the second rod 241. The second rod 241 includes a distal end 243 away from the second rack 242. The second rod 241 extends through the second sliding groove 224 of the first sliding member 22 and is thus slidable along the second sliding groove 224.

The stopper 25 is fixed to the distal end 243 of the second sliding member 24. A shape and dimension of the stopper 25 match with a shape and dimension of the first open end 213 of the barrel 21, for preventing outside liquid from entering the first sliding groove 211 through the first open end 213.

The second driver 26 is used to drive the second sliding member 24 to slide back and forth in the second sliding groove 224. In the embodiment, the second driver 26 includes a second gear 261 and a second motor 262 with an output shaft (not labeled), to which the second gear 261 is fixed. The second gear 261 engages with the second rack 242 of the second sliding member 24, thereby converting the rotation of the second gear 261 into the sliding movement of the second sliding member 24.

FIG. 4 shows that if liquid flows into the closed groove 113, the liquid will flow into the first sliding groove 211 through the slot 212, and the stopper 25 is retained in the first open end 213.

Figure 5:
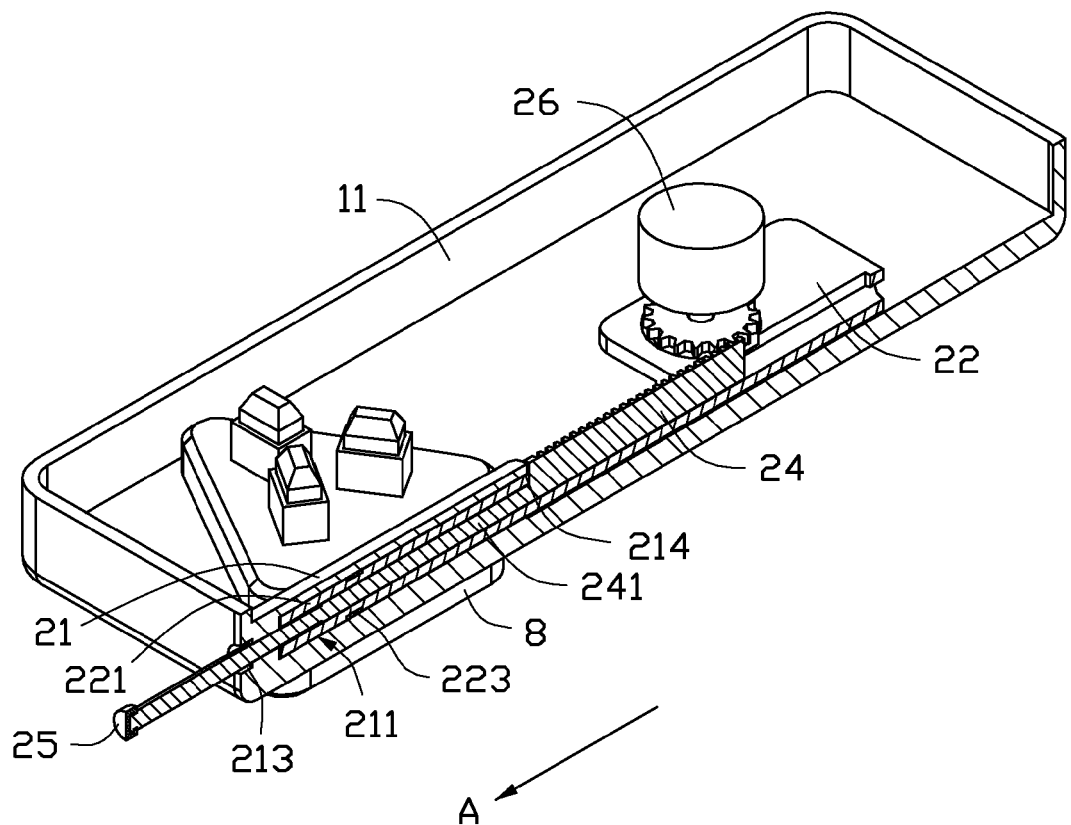

FIG. 5 shows that in operation, the second driver 26 is controlled to drive the second sliding member 24 to slide in a first direction for unsealing the first open end 213 of the first sliding groove 211. The first driver 23 is controlled to drive the first sliding member 22 to slide in the first direction A, pushing the liquid out of the open end 213.

Figure 6:
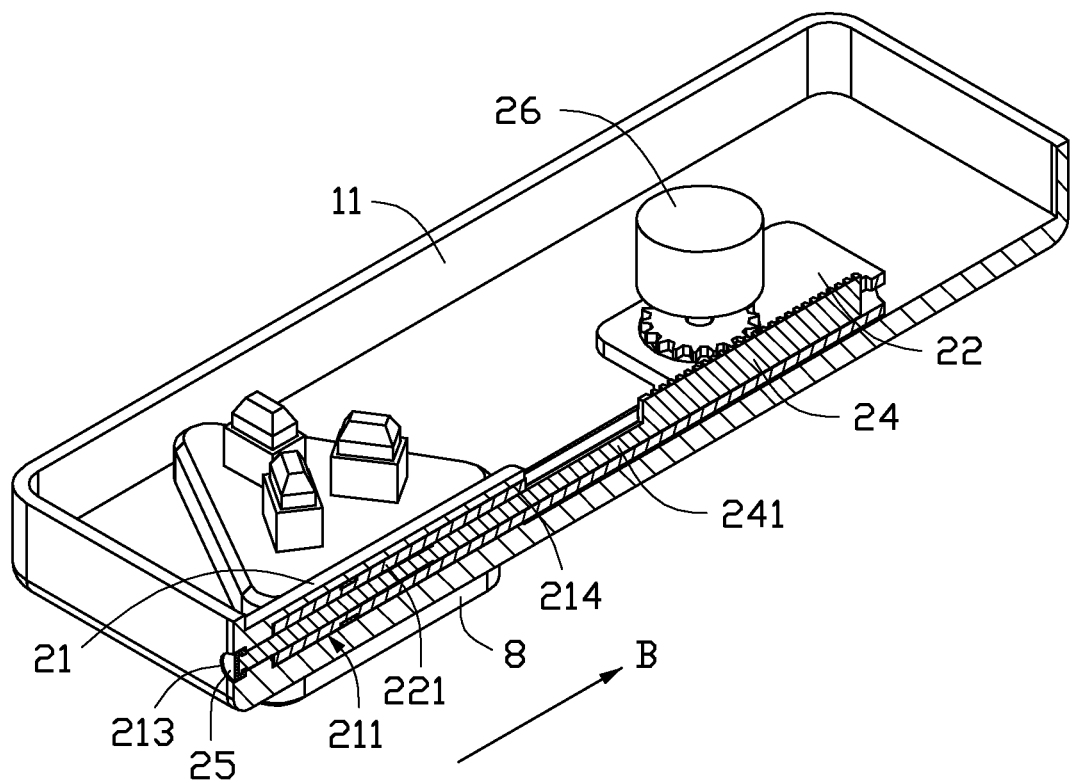

FIG. 6 shows that when needed, the second driver 26 is controlled to drive the second sliding member 24 to slide in a reverse second direction B. Till the stopper 25 reaches the first open end 213 of the first sliding groove 211, the first open end 213 is sealed by the stopper 25. Then the first driver 23 is controlled to drive the first sliding member 22 to slide along the second direction B, thereby returning to original position as shown in FIG. 4.

Figure 7:
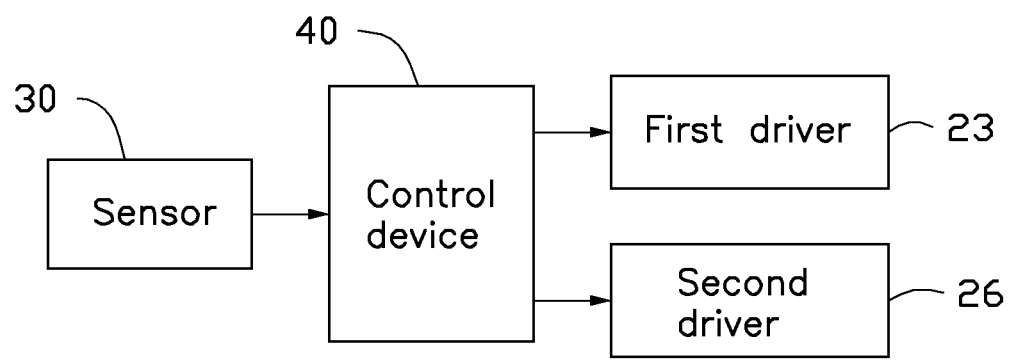
FIG. 7 is a schematic block diagram view of the electrical outlet of FIG. 1.

In the embodiment, the first driver 23 and the second driver 26 is manually operated and work in a process following the above described steps. In another embodiment, as shown in FIG. 7, the electrical outlet 1 further includes a sensor 30 and a control device 40 connected to the first driver 23 and the second driver 26. The sensor 30 is used to detect a volume of the liquid accommodated in the first sliding groove 211. When the volume detected by the sensor 30 is greater than a threshold value, the control device 40 controls the first driver 23 and the second driver 26 to work in a process following the above described steps. Thus, the liquid accommodated in the first sliding groove 211 can be automatically drained.

In the embodiment, the electrical outlet 1 further includes a third sealing ring 115 around the first block 81 of the electrical plug 8 and a number of fourth sealing rings 117 respectively around the prongs 83 of the electrical plug 8, thereby further preventing liquid from entering the electrical outlet 1.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. An electrical outlet for receiving an electrical plug, the electrical outlet comprising:
    a housing defining a recess for receiving the electrical plug and a closed groove in a bottom of the recess; and
    a draining mechanism accommodated in the housing and comprising:
        a barrel defining a first sliding groove and a slot communicating with both the first sliding groove and the closed groove, the first sliding groove comprising a first, external open end and an opposite second open end;
        a first sliding member comprising a first rod slidably retained in the first sliding groove through the second open end; and
        a first driver configured to drive the first sliding member to slide back and forth along the first sliding groove for pushing liquid out of the first sliding groove through the first open end.

2. The electrical outlet as described in claim 1, wherein the housing comprises an upper housing and a lower housing coupled to each other, and the upper housing and the lower housing cooperatively define a receiving space therebetween for receiving the draining mechanism.

3. The electrical outlet as described in claim 1, the closed groove extends along the side surface of the recess.

4. The electrical outlet as described in claim 1, wherein the first sliding member comprises a sealing ring around the first rod and staying in tight contact with an inner surface of the first sliding groove.

5. The electrical outlet as described in claim 1, wherein the first sliding member comprises a first rack connected to one end of the first rod, the first driver comprises a first motor and a first gear engaging with the first rack for converting a rotation of the first gear into a sliding movement of the first sliding member.

6. The electrical outlet as described in claim 1, wherein the first rod of the first sliding member defines a second sliding groove, the draining mechanism comprises a second sliding member, a stopper, and a second driver, the second sliding member comprises a second rod slidably retained in the second sliding groove, the stopper is fixed to one end of the second rod for sealing the first open end of the first sliding groove, and the second driver is configured to drive the second sliding member to slide back and forth along the second sliding groove.

7. The electrical outlet as described in claim 6, wherein the second sliding member comprises a second rack connected to one end of the second rod, the second driver comprises a second motor and a second gear engaging the second rack for converting the rotation of the second gear into the sliding movement of the second sliding member.

8. The electrical outlet as described in claim 1, further comprising a sensor to detect a volume of the liquid accommodated in the first sliding groove and a control device to control the draining mechanism to work when the detected volume of the liquid is greater than a threshold value.

* * * * *